United States Patent

Adachi

(10) Patent No.: US 11,328,494 B2
(45) Date of Patent: May 10, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Daichi Adachi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 79 days.

(21) Appl. No.: 16/509,922

(22) Filed: Jul. 12, 2019

(65) Prior Publication Data

US 2020/0035039 A1 Jan. 30, 2020

(30) Foreign Application Priority Data

Jul. 25, 2018 (JP) .............................. JP2018-139350

(51) Int. Cl.
G06T 19/20 (2011.01)
G06T 7/70 (2017.01)
(Continued)

(52) U.S. Cl.
CPC .............. G06T 19/20 (2013.01); G06T 5/003 (2013.01); G06T 7/70 (2017.01); G06T 15/20 (2013.01);
(Continued)

(58) Field of Classification Search
CPC ...... G06F 3/012; G06F 3/011; G06F 3/04815; G06F 3/013; G06F 3/04845;
(Continued)

(56) References Cited

U.S. PATENT DOCUMENTS

2013/0058591 A1* 3/2013 Nishiyama ............. H04N 5/217
382/264
2016/0100034 A1* 4/2016 Miller ..................... A63F 13/35
709/205

(Continued)

FOREIGN PATENT DOCUMENTS

EP 2566150 A2 3/2013
EP 3293723 A1 3/2018

(Continued)

OTHER PUBLICATIONS

Nie, Guangyu, Yue Liu, and Yongtian Wang. "[Poster] Prevention of Visually Induced Motion Sickness Based on Dynamic Real-Time Content-Aware Non-salient Area Blurring." 2017 IEEE International Symposium on Mixed and Augmented Reality (ISMAR-Adjunct). IEEE, 2017. (Year: 2017).*

(Continued)

Primary Examiner — Phi Hoang
Assistant Examiner — Scott E Sonners
(74) Attorney, Agent, or Firm — Rossi, Kimms & McDowell LLP

(57) ABSTRACT

An image processing apparatus in an embodiment of the present disclosure includes: an obtaining unit configured to obtain viewpoint information indicating a change over time in a viewpoint corresponding to a virtual image; and a generation unit configured to generate the virtual image from the viewpoint according to the viewpoint information obtained by the obtaining unit such that among a plurality of objects included in the generated virtual image, an object whose position in the virtual image changes by a first amount according to the change of the viewpoint indicated by the viewpoint information is lower in clearness than an object whose position in the virtual image changes by a (Continued)

second amount smaller than the first amount according to the change of the viewpoint.

20 Claims, 13 Drawing Sheets

(51) Int. Cl.
  *G06T 5/00* (2006.01)
  *G06T 15/20* (2011.01)
  *G06T 19/00* (2011.01)
(52) U.S. Cl.
  CPC .... *G06T 19/006* (2013.01); *G06T 2219/2024* (2013.01)
(58) Field of Classification Search
  CPC ........ G06F 3/0485; G06F 3/147; G06F 1/163; G06F 3/017; G06F 3/0346; G02B 27/017; G02B 2027/014; G02B 2027/0187; G02B 2027/0123; G02B 27/0093; G02B 2027/0141; G06T 19/006; G06T 15/20; G06T 7/70; G06T 2200/24; G06T 2207/10016; G06T 2207/20221; G06T 5/003; G06T 15/08; G06T 15/205; G06T 15/30; G06T 2200/32; G06T 2207/30244; G06T 2215/16; G06T 7/0016; G06T 7/20; G06T 7/74; G06T 7/80; H04N 5/23238; H04N 5/23229; H04N 5/262; H04N 13/00

See application file for complete search history.

(56) References Cited

U.S. PATENT DOCUMENTS

| | | | |
|---|---|---|---|
| 2017/0076496 | A1 | 3/2017 | Inomata |
| 2017/0148206 | A1* | 5/2017 | Donner .................... G06T 15/04 |
| 2018/0075660 | A1* | 3/2018 | Jouet ........................ G01P 13/00 |
| 2018/0096517 | A1* | 4/2018 | Mallinson .......... G02B 27/0093 |
| 2018/0121069 | A1* | 5/2018 | DiVerdi .................. G06F 3/011 |
| 2019/0220089 | A1* | 7/2019 | Kakizawa ................. G06T 7/73 |

FOREIGN PATENT DOCUMENTS

| | | |
|---|---|---|
| JP | 2007116309 A | 5/2007 |
| JP | 2017058493 A | 3/2017 |

OTHER PUBLICATIONS

Ang S, Quarles J. Gingervr: An open source repository of cybersickness reduction techniques for unity. In2020 IEEE Conference on Virtual Reality and 3D User Interfaces Abstracts and Workshops (VRW) Mar. 22, 2020 (pp. 460-463). IEEE. (Year: 2020).*

Extended European Search Report issued in European Appln. No. 19185279.7 dated Nov. 12, 2019.

Fernandes. "Combating VR Sickness through Subtle Dynamic Field-Of-View Modification." IEEE Symposium on 3D User Interfaces. Mar. 19-20, 2016: 201-210. Cited in NPL 1.

* cited by examiner

FIG.11
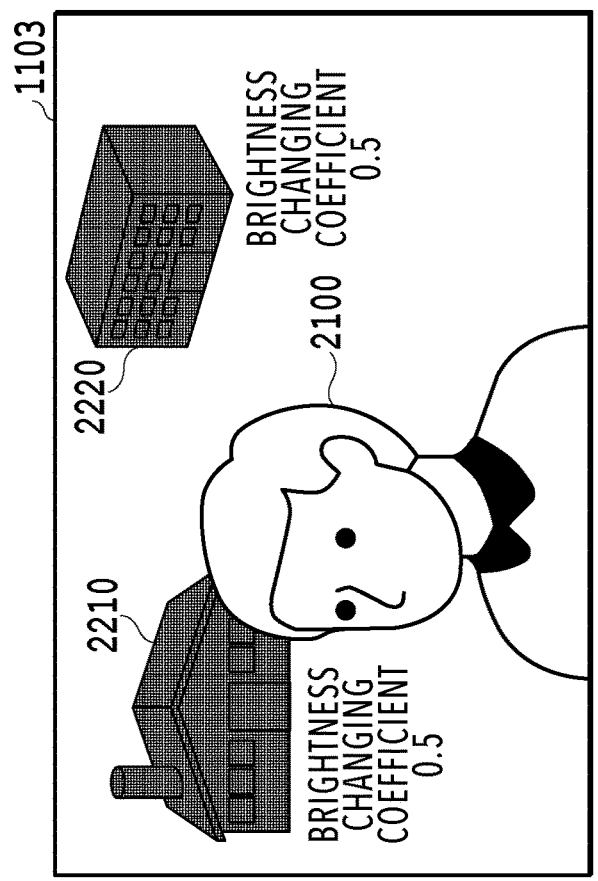
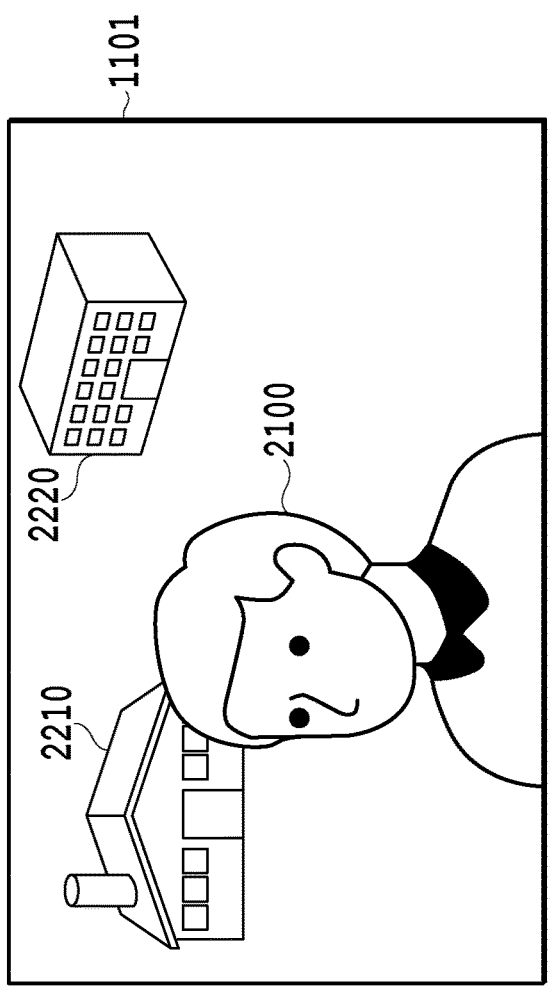
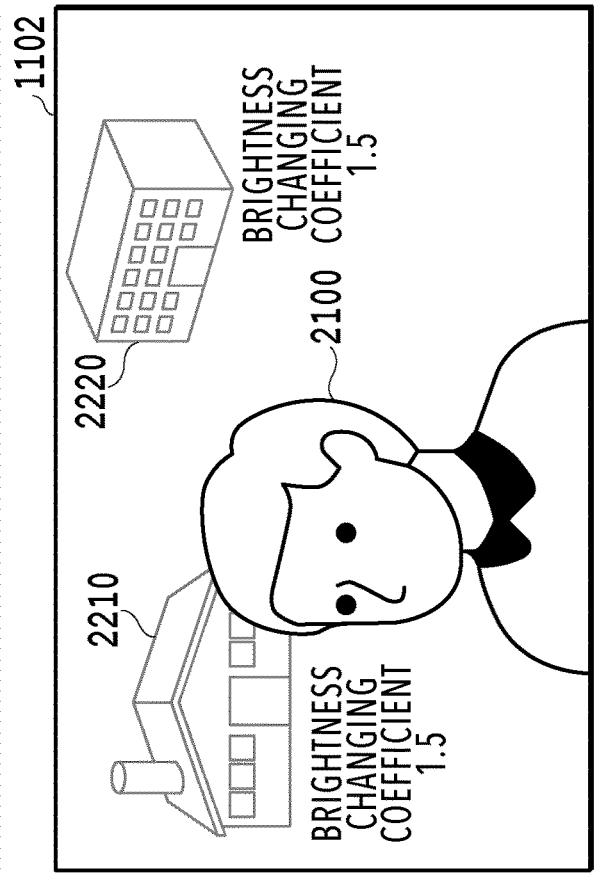

IMAGE PROCESSING APPARATUS, IMAGE PROCESSING METHOD, AND STORAGE MEDIUM

BACKGROUND OF THE INVENTION

Field of the Invention

The present disclosure relates to an image processing apparatus, an image processing method, and a storage medium.

Description of the Related Art

In the field of computer graphics, human and building objects arranged in a three-dimensional virtual space are projected in a virtual camera capable of moving in the virtual space to generate and display a virtual image as an image viewed from the virtual camera.

In a case of viewing this virtual image displayed as a video on a display, the viewer is likely to experience visually-induced motion sickness if the movement of the virtual camera is fast. To address this, Japanese Patent Laid-Open No. 2017-58493 discloses a method of reducing visually-induced motion sickness by generating and displaying a transition image in which the resolution and contrast of an entire image or the peripheral portion of the image are reduced according to the movement of a virtual camera.

However, the method disclosed in Japanese Patent Laid-Open No. 2017-58493 may reduce the resolution and contrast of an object of interest in the displayed image and may possibly decrease the visual recognizability of the object.

SUMMARY OF THE INVENTION

An image processing apparatus in an embodiment of the present disclosure comprises: an obtaining unit configured to obtain viewpoint information indicating a change over time in a viewpoint corresponding to a virtual image: and a generation unit configured to generate the virtual image from the viewpoint according to the viewpoint information obtained by the obtaining unit such that among a plurality of objects included in the generated virtual image, an object whose position in the virtual image changes by a first amount according to the change of the viewpoint indicated by the viewpoint information is lower in clearness than an object whose position in the virtual image changes by a second amount smaller than the first amount according to the change of the viewpoint.

Further features of the present disclosure will become apparent from the following description of exemplary embodiments with reference to the attached drawings.

BRIEF DESCRIPTION OF THE DRAWINGS

FIG. 11 is a diagram illustrating a virtual image before and after a brightness changing process in the third embodiment;

DESCRIPTION OF THE EMBODIMENTS

Embodiments of the present disclosure will be specifically described below with reference to the drawings.

First Embodiment

In the present embodiment, a blurring process (image quality changing process) is performed on objects with large movements in a virtual image obtained by projecting objects such as a person and structures in a three-dimensional virtual space into a virtual camera set in the virtual space (a virtual image from the viewpoint of the virtual camera). In the present embodiment, a method of reducing visually-induced motion sickness by doing the above will be described. Note that the virtual image in each of the following embodiments may be an image entirely generated by computer graphics or an image generated on the basis of images captured by image capture apparatuses. For example, the virtual image may be a virtual viewpoint image (free viewpoint video) generated on the basis of images of an image capture target region captured from a plurality of directions with a plurality of image capture apparatuses placed at different positions and viewpoint information indicating a virtual viewpoint.

Figure 1:
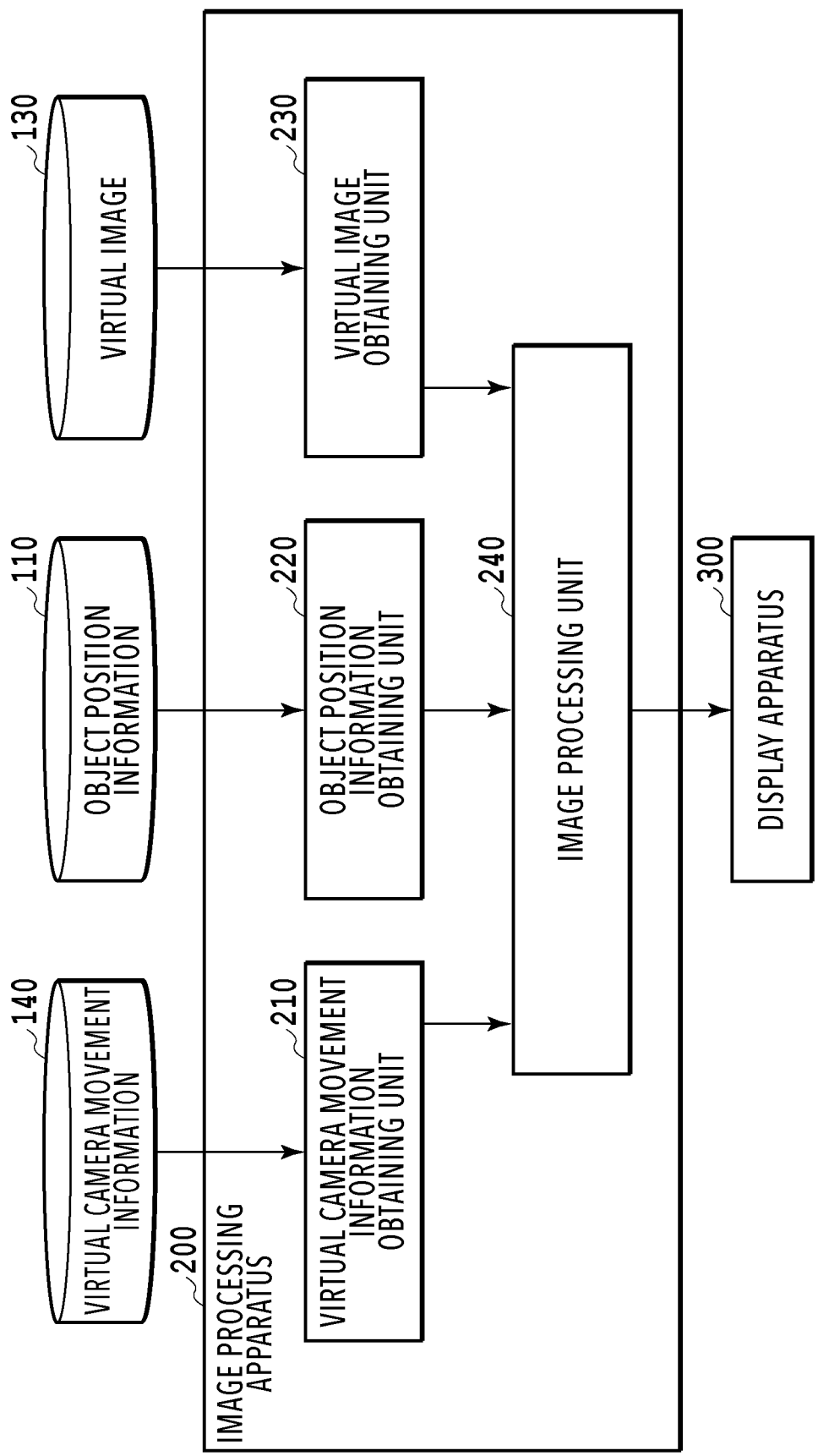
FIG. 1 is a configuration diagram of an image processing system in a first embodiment.

FIG. 1 illustrates the configuration of an image processing system in the present embodiment. An image processing apparatus 200 has a virtual camera movement information obtaining unit 210, an object position information obtaining unit 220, a virtual image obtaining unit 230, and an image processing unit 240. Also, the image processing apparatus 200 is connected to a storage apparatus (not illustrated) storing the data of virtual camera movement information 140, object position information 110, and a virtual image 130 and to a display apparatus 300 (such as a liquid crystal display) through a network. The virtual camera movement information obtaining unit 210, the object position information obtaining unit 220, and the virtual image obtaining unit 230 obtain the data of the virtual camera movement information 140, the object position information 110, and the virtual image 130 through the network, respectively. Note that in the case where the virtual image to be processed by the image processing apparatus 200 is a virtual viewpoint image based on captured images, the object position information 110 may be data obtained by identifying the positions of objects in the image capture target region on the basis of the captured images. The obtained data is stored in a storage unit (not illustrated) in the image processing apparatus 200. The image processing unit 240 performs the later-described image processing on the virtual image 130 by using the virtual camera movement information 140 and the object position information 110. The virtual image 130 after the image processing is transmitted to the display apparatus 300 through the network. The display apparatus 300 displays the received virtual image 130. In other words, the display apparatus 300 is an image display apparatus. Note that the destination to output the virtual image 130 from the image processing unit 240 is not limited to the display apparatus 300 but may be, for example, the storage apparatus storing the virtual image 130.

Figure 2:
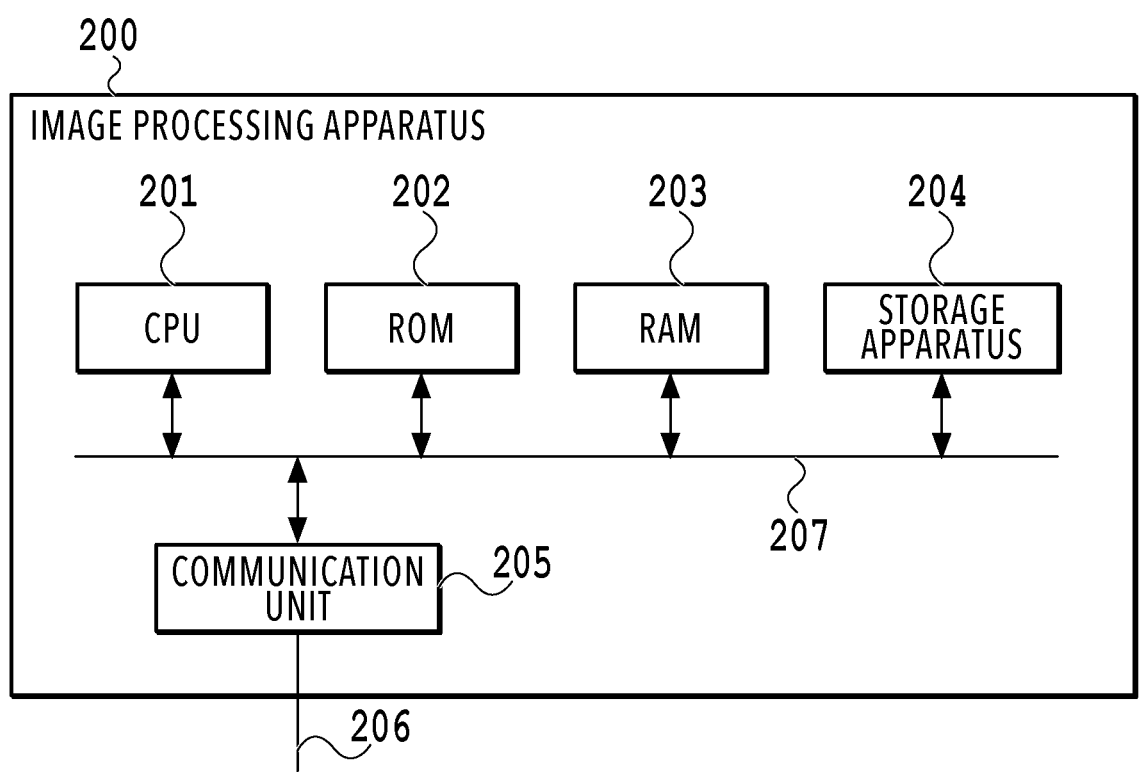
FIG. 2 is a hardware configuration diagram of an image processing apparatus in the first embodiment.

FIG. 2 is a hardware configuration diagram of the image processing apparatus in the present embodiment. The image processing apparatus 200 has a CPU 201, an ROM 202, an RAM 203, a storage apparatus 204, and a communication unit communication unit 205.

The CPU 201 is a central processing unit that controls the entire image processing apparatus 200 and takes overall control of process sequences in the image processing apparatus 200. The ROM 202 and the storage apparatus 204 store a program and data for implementing the processing illustrated in the later-described flowchart. The RAM 203 is used to temporarily store the data and to load the program. The communication unit 205 transmits and receives data to and from external apparatuses through a network 206. For example, the communication unit 205 transmits the virtual image 130 after the image processing by the image processing apparatus 200 to the display apparatus 300 through the network 206. The constituent elements of the image processing apparatus 200 are connected to each other by a bus 207.

Figure 3:
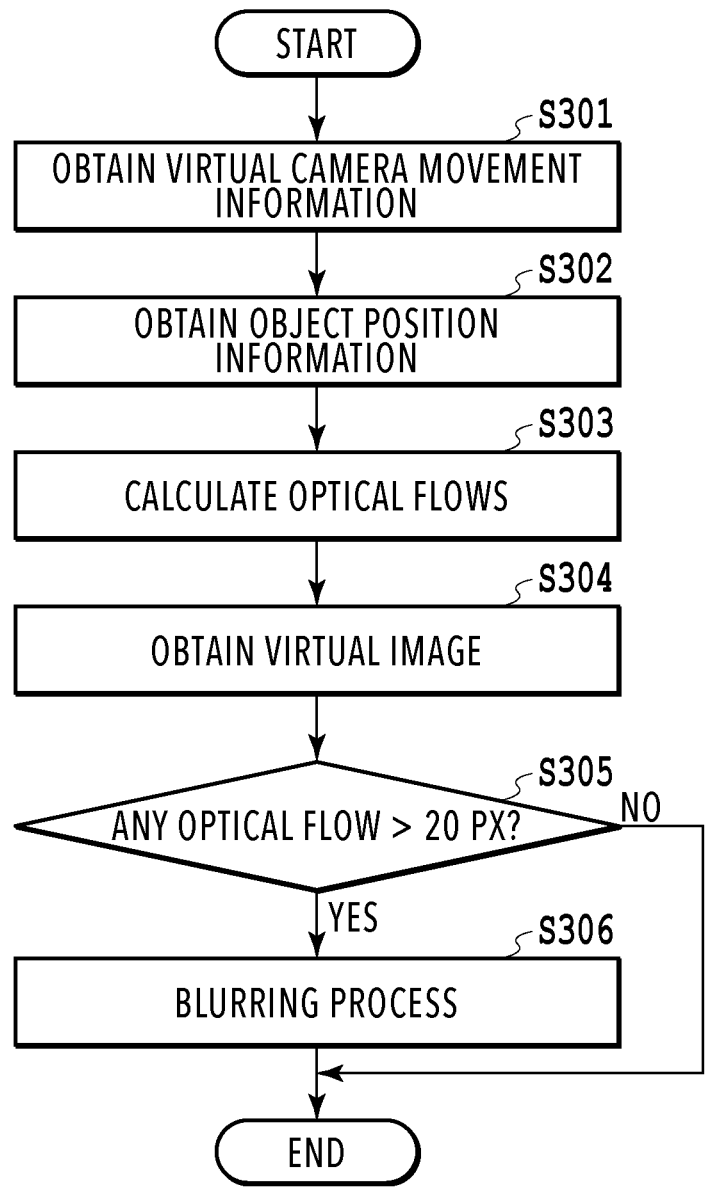
FIG. 3 is a diagram illustrating a flowchart of image processing in the first embodiment.

FIG. 3 illustrates a flowchart of the image processing by the image processing apparatus 200. The CPU 201 of the image processing apparatus 200 performs the series of processes illustrated in the flowchart by deploying a control program stored in the ROM 202 or the storage apparatus 204 to the RAM 203 and executing it. Alternatively, the functions of some or all of the steps in the flowchart may be implemented with hardware such as an ASIC or an electronic circuit. The symbol "S" in the description of each process means a step in the flowchart. This applies to the other flowcharts.

Figure 4:
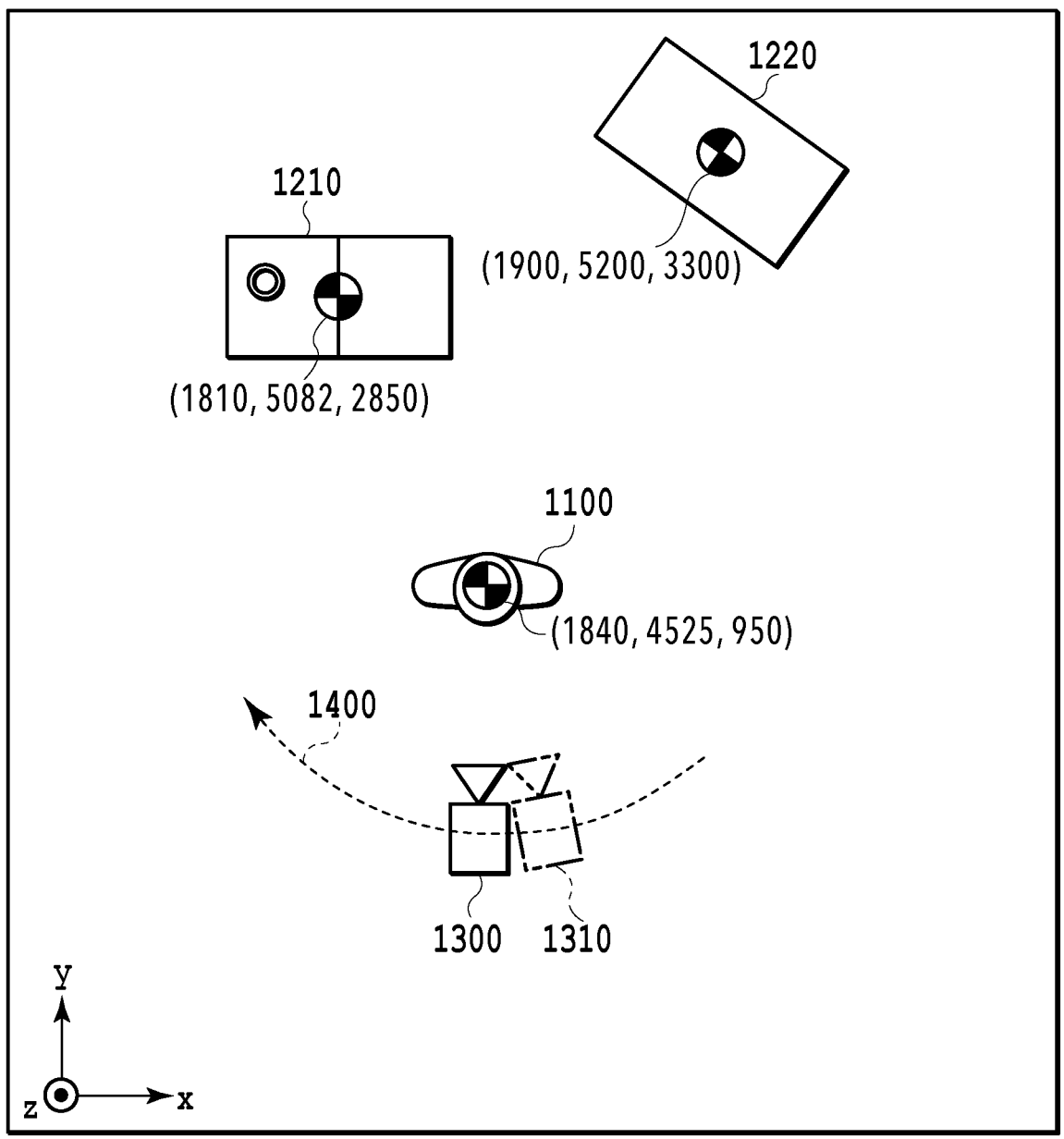
FIG. 4 is a diagram illustrating the positions of objects and a virtual camera in a virtual space in the first embodiment.

At S301, the virtual camera movement information obtaining unit 210 obtains the virtual camera movement information 140. The virtual camera movement information 140 contains a position $T(t)=(t_x, t_y, t_z)$ and an orientation $r(t)=(r_x, r_y, r_z)$ of a virtual camera at a time t. The virtual camera movement information 140 may also contain a speed $V(t)=(vt_x, vt_y, vt_z, vr_x, vr_y, vr_z)$ of the virtual camera at the time t. The speed V(t) is the derivative of the position and orientation of the virtual camera with a unit time set as a video frame interval. The virtual camera movement information 140 may also contain a position T(t-1) and an orientation r(t-1) of the virtual camera at a time t-1, which precedes the time t by a single frame. The virtual camera movement information 140 represents an example of viewpoint information indicating a change over time in position and orientation of the virtual camera. FIG. 4 illustrates the positions of objects and the virtual camera in a virtual space. The positions of the objects and the virtual camera are each expressed as XYZ coordinates. Meanwhile, FIG. 4 illustrates the positions of the objects and the virtual cameras as seen from the Z-axis direction. A virtual camera 1300 at the time t and a virtual camera 1310 at the time t-1, preceding the time t by a single frame, are illustrated on a path 1400. In the illustrated example, the virtual camera 1300 moves about an object 1100 while facing in the direction toward the object 1100. Thus, in the video through the virtual camera, the object 1100 always appears in the center of the virtual image. Note that the virtual camera may move in accordance with the user's instruction received through an input apparatus (not illustrated) or move as specified in advance. The object 1100 is a human object and is an example of a foreground object. On the other hand, objects 1210 and 1220 are building objects and are an example of a background. Meanwhile, the number of objects in the virtual space is not limited. One or more objects can be arranged.

Then at S302, the object position information obtaining unit 220 obtains the object position information 110 to identify the positions of the objects. The object position information 110 contains the three-dimensional coordinates of the barycenters (hereinafter also referred to as the barycentric coordinates) of the objects 1100, 1210, and 1220 in the virtual space. In FIG. 4, the barycentric coordinates of the object 1100 are (1840, 4525, 950), the barycentric coordinates of the object 1210 are (1810, 5082, 2850), and the barycentric coordinates of the object 1220 are (1900, 5200, 3300). Note that the object position information 110 is not limited to the barycenter of each object but may be a representative point of the object or a set of three-dimensional coordinates of a plurality of elements consisting the object (such as a group of the vertices of a mesh polygon).

Then at S303, the image processing unit 240 calculates the magnitudes of the optical flows of image coordinates obtained by projecting the object position information 110 in the virtual camera (the amount of change in the position of the object in the virtual image change). Specifically, the image processing unit 240 calculates by how many pixels (px) each pixel where the object position information 110 (the three-dimensional coordinates of the barycenter of each object) is projected moves within a single frame. A coordinate system conversion from three-dimensional coordinates (X, Y, Z) to image coordinates u(t)=(u, v) is performed using projective transformation by a general perspective projection with equation (1) below.

$$\begin{pmatrix} u \\ v \\ 1 \end{pmatrix} \sim A \begin{pmatrix} R & T \\ 0 & 1 \end{pmatrix} \begin{pmatrix} X \\ Y \\ Z \\ 1 \end{pmatrix} \quad (1)$$

Here, the symbol "~" indicates that the both sides are equal except that one is a constant multiple of the other. Also, A (3×3 matrix) is an intrinsic parameter matrix determined by the focal length and resolution of the virtual camera, R (3×3 matrix) is a rotation matrix obtained from the orientation r(t) of the virtual camera with Rodrigues' rotation formula, and T (3×1 matrix) is a matrix representing a translation vector obtained from the position T(t) of the virtual camera.

Figure 5:
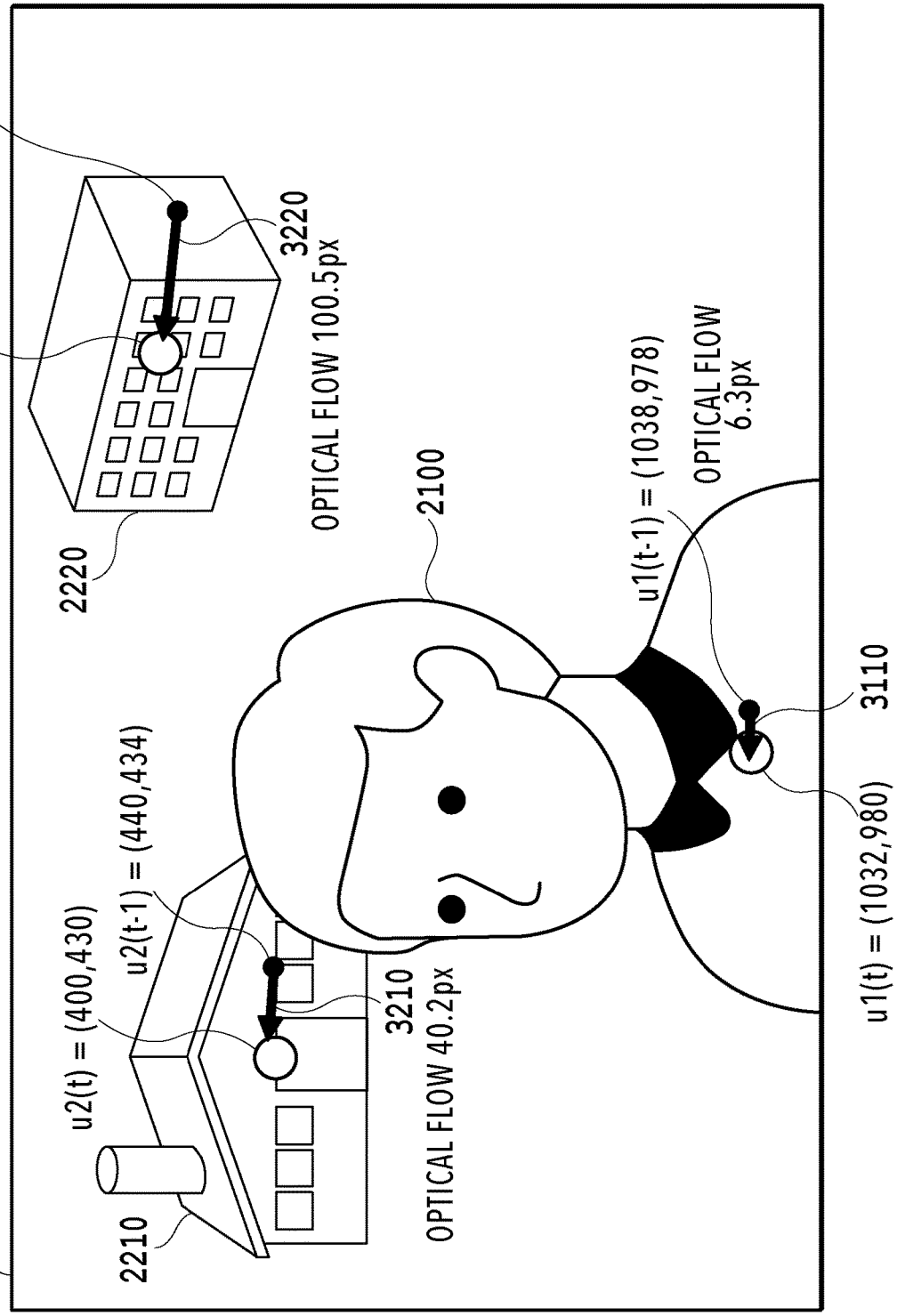
FIG. 5 is a diagram illustrating a virtual image in the first embodiment.

The image processing unit 240 calculates the image coordinates u(t) at the time t in this manner. The image processing unit 240 similarly calculates image coordinates u(t-1) at the time t-1. The image coordinates u(t-1) can be calculated using the virtual camera movement information 140 at the time t-1. Note that the virtual camera movement information 140 at the time t-1 may be calculated from the virtual camera movement information 140 at the time t by using the speed V(t) of the virtual camera at the time t. FIG. 5 illustrates a virtual image obtained by projecting the objects 1100, 1210 and 1220 in the virtual camera 1300 at the time t. A virtual image 501 includes images 2100, 2210, and 2220 as the result of the projection of the objects 1100, 1210, and 1220. Also, u1(*t*) and u1(*t*-1) represent the points to which the barycenter of the object 1100 is projected in the virtual camera 1300 at the time t and in the virtual camera 1310 at the time t-1, preceding the time t by a single frame. Similarly, u2(*t*) and u2(*t*-1) represent the points where the barycenter of the object 1210 is projected, and u3(*t*) and u3(*t*-1) represent the points where the barycenter of the object 1220 is projected. In this case, the optical flow of the barycenter of the object 1100 from the time t-1 to the t is expressed as a vector 3110. Meanwhile, the magnitude of the vector 3110 is 6.3 px with the image coordinates u1(*t*)=(1032, 980) and u1(*t*-1)=(1038, 978), calculated from equation (1). In other words, the magnitude of the vector 3110 is the distance between the image coordinates u1(*t*) and u1(*t*-1). Similarly, the magnitude of the optical flow of the barycenter of the object 1210 (i.e., vector 3210) is 40.2 px with the image coordinates u2(*t*)=(400, 430) and u2(*t*-1)=(440, 434), calculated from equation (1). Moreover, the magnitude of the optical flow of the barycenter of the object 1220 (i.e., vector 3220) is 100.5 px with the image coordinates u3(*t*)=(1680, 355) and u3(*t*-1)=(1780, 365), calculated from equation (1). The image processing unit 240 thus functions as a movement deriving unit configured to derive the magnitudes of movements of images of objects corresponding to the movement of the virtual camera.

At S304, the virtual image obtaining unit 230 obtains the virtual image 130. The virtual image 130 can be the virtual image 501, illustrated in FIG. 5, after a rendering process performed outside the image processing apparatus 200.

At S305, the image processing unit 240 determines whether any of the optical flows of the objects calculated at S303 (i.e., the derived results) has a magnitude larger than a predetermined threshold value, e.g., 20 px. If the magnitudes of the optical flows of all objects are smaller than or equal to 20 px, the processing is terminated. On the other hand, if there is one or more objects having an optical flow with a magnitude larger than 20 px, the processing proceeds to S306. In the virtual image 501 in FIG. 5, the magnitudes of the optical flows of the objects 1210 and 1220 (i.e., vectors 3210 and 3220) are both larger than 20 px, and the processing therefore proceeds to S306.

Figure 6:
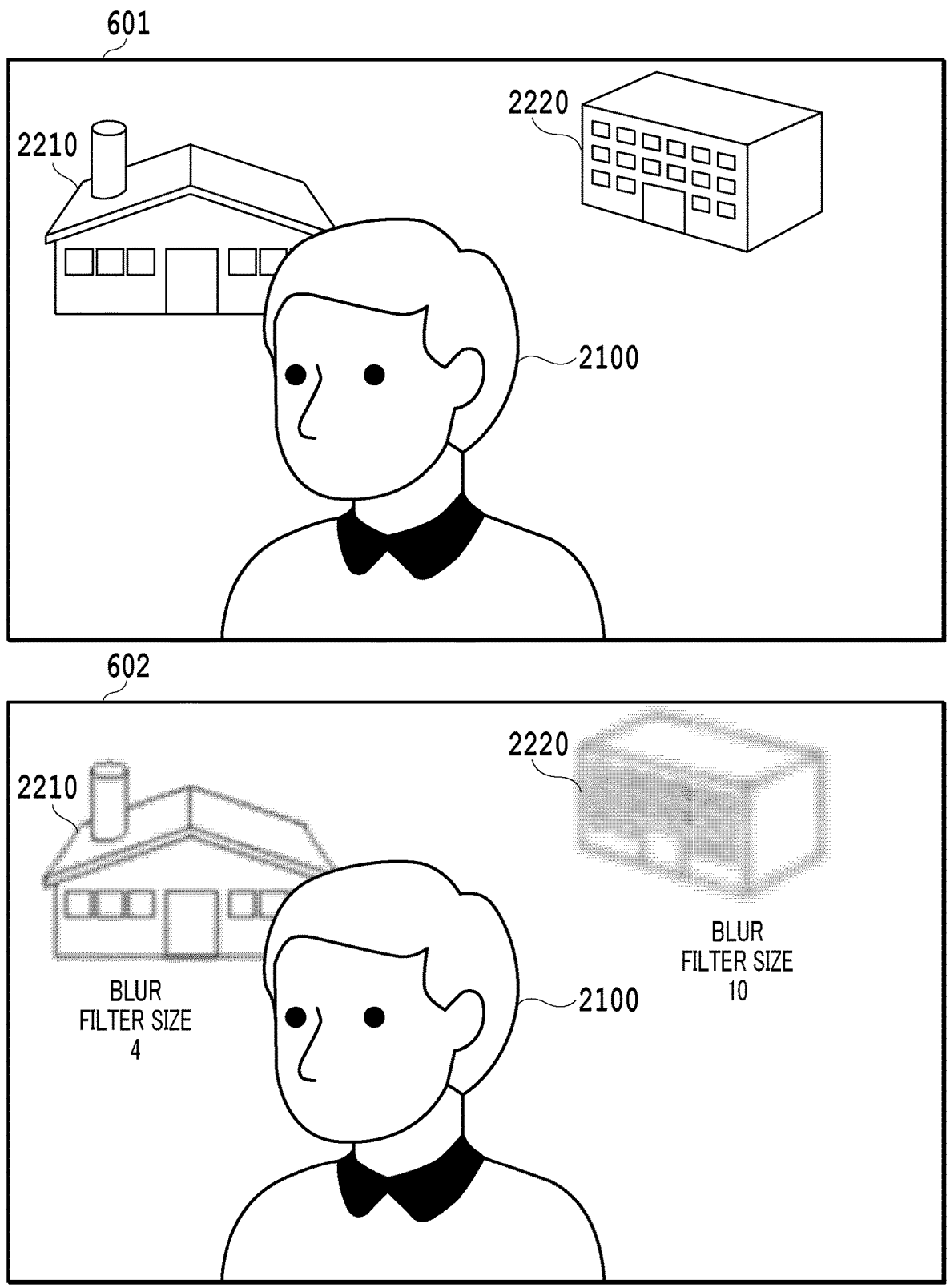
FIG. 6 is a diagram illustrating the virtual image before and after a blurring process in the first embodiment.

At S306, the image processing unit 240 performs a blurring process on the images 2210 and 2220 of the objects 1210 and 1220, whose optical flows have been determined to be larger than the predetermined value. Gaussian filters can be used as image filters for the blurring process. The filter size of each Gaussian filter is determined by multiplying the magnitude of the corresponding optical flow by a coefficient a (=0.1). FIG. 6 illustrates a virtual image 601 before the blurring process and a virtual image 602 after the blurring process in the present embodiment. In the virtual image 602 after the blurring process, the images 2210 and 2220 are unsharp due to the blurring process. In other words, in the present embodiment, the background is blurred to the viewer look at the object in the foreground. Meanwhile, the larger the optical flow, the larger the filter size of the applied Gaussian filter. Accordingly, the image 2220 has a larger amount of blur (i.e., a higher degree of change in image quality) than the image 2210. The image processing unit 240 thus functions as an image quality changing unit configured to change an image quality of images of objects.

After the above steps are finished, the image processing unit 240 transmits the virtual image to the display apparatus 300. The display apparatus 300 displays the received virtual image as a video.

As described above, in the present embodiment, in a virtual image in which objects in a virtual space are projected, a blurring process is performed on objects with large movements (the building objects in the above example). In other words, an image quality of the objects with large movements is changed. Accordingly, the viewer is likely to look at the image of an object with a small movement (the human object in the above example). It is therefore possible to reduce visually-induced motion sickness while maintaining the image quality of the object with a small movement.

In the above blurring process at S306, each filter size is determined according to the magnitude of the corresponding optical flow. However, the images of the objects may be processed collectively with a predetermined filter size (e.g., filter size 10) irrespective of the sizes of their optical flows. Also, instead of Gaussian filters, motion blur filters may be used according to the directions of the respective optical flows. Still alternatively, averaging filters may be used.

Also, in the above embodiment, the image processing apparatus 200 obtains a virtual image that has already been generated, and performs image processing on portions of the virtual image corresponding to particular objects on the basis of the result of determination on the movements of all objects in the virtual image. However, the embodiment is not limited to this case. The image processing apparatus 200 may generate a virtual image on the basis of material data such as virtual camera information and captured images. In this case, the image processing apparatus 200 may firstly generate a virtual image in the above manner and then perform image processing on particular portions of the virtual image. Alternatively, the image processing apparatus 200 may control the image quality of portions corresponding to particular objects on the basis of the material data when performing rendering on the virtual image.

Second Embodiment

In the first embodiment, a blurring process is performed as the image quality changing process, but the content of the image quality changing process is not limited to blurring. The image quality changing process may only need to be a process that reduces the clearness of objects with large movements in the virtual image. In the first embodiment, a description has been given of a method in which the amount of blur is increased to reduce the clearness, which is inversely correlated to the amount of blur. In the present embodiment, a description will be given of a method of reducing visually-induced motion sickness by performing a resolution reduction process to reduce the clearness, which is correlated to resolution.

In the following, description of configurations and a process flow similar to those in the first embodiment is omitted.

Figure 7:
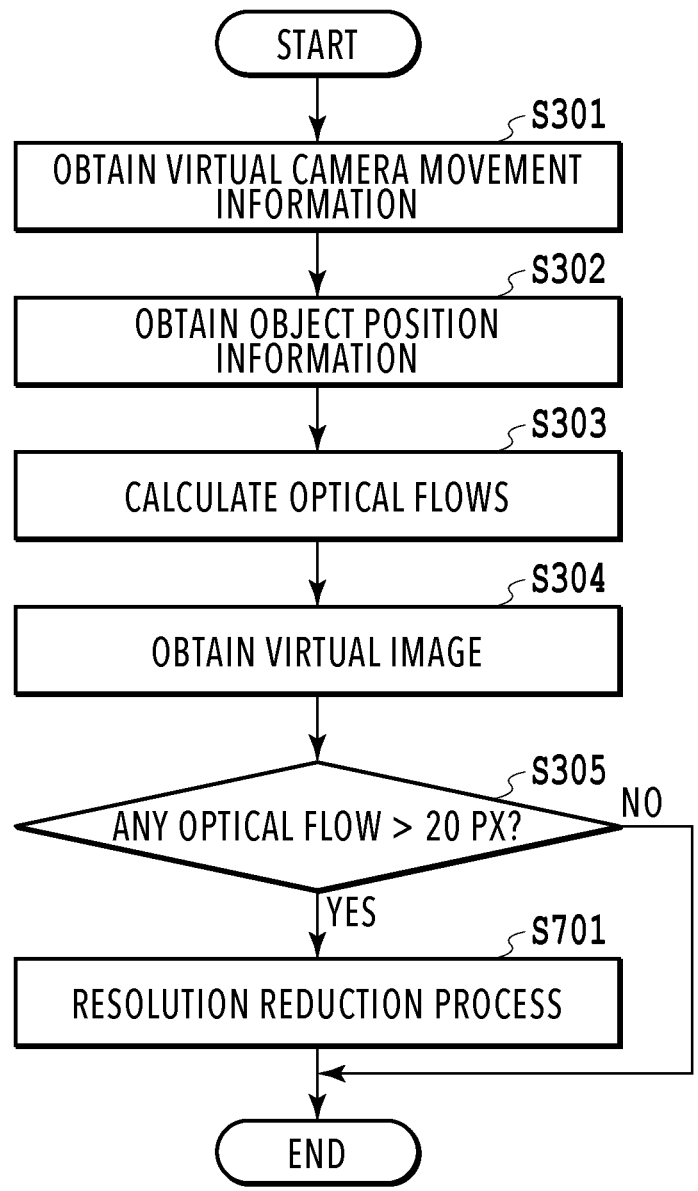
FIG. 7 is a diagram illustrating a flowchart of image processing in a second embodiment.

FIG. 7 illustrates the process flow of the image processing in the present embodiment. The processes at S301 to S305 are similar to those in the flowchart in FIG. 3 in the first embodiment.

At S701, the image processing apparatus 200 performs the resolution reduction process on the images 2210 and 2220, whose optical flows have been determined to be larger than the predetermined value.

Figure 8:
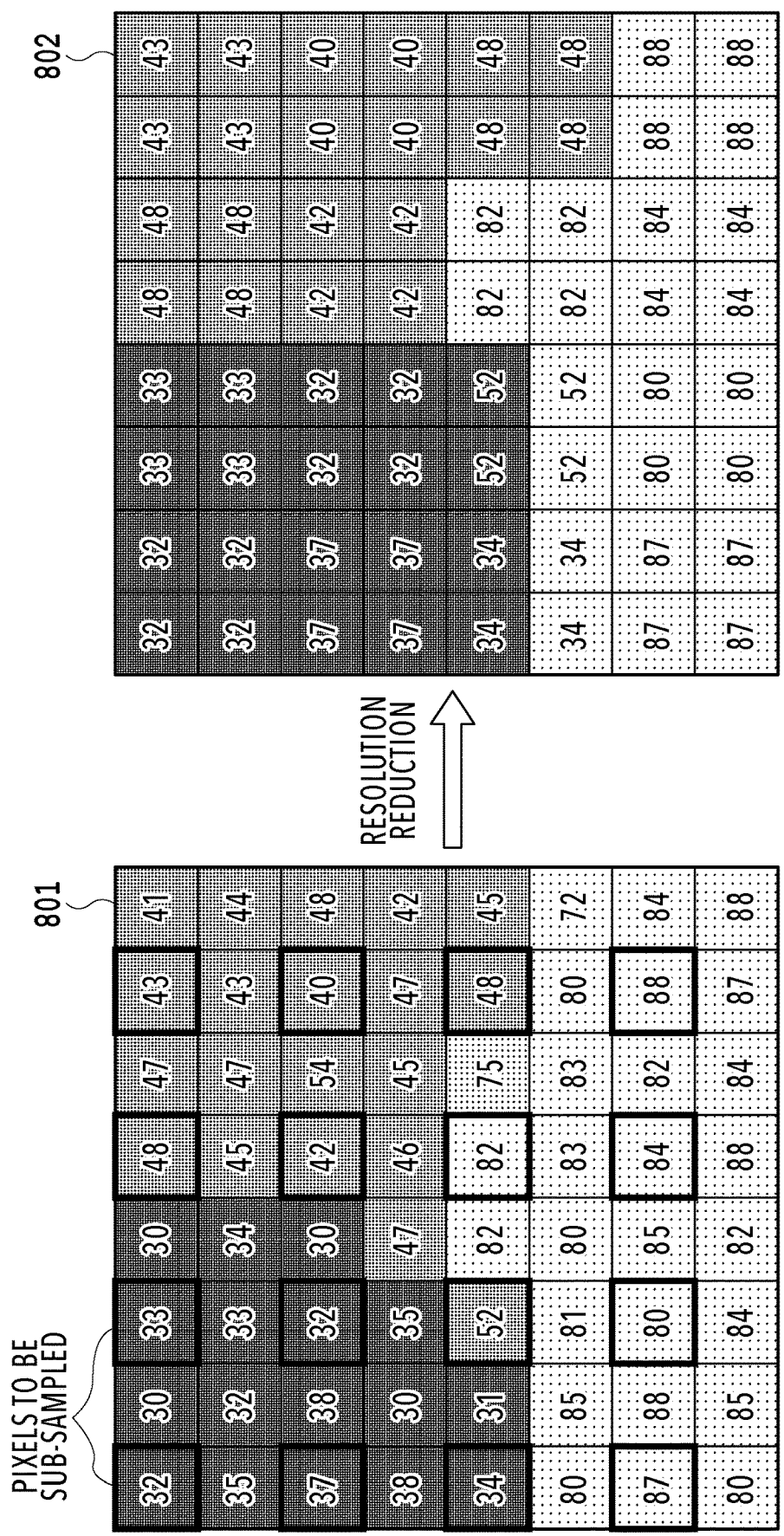
FIG. 8 is a diagram explaining a resolution reduction process in the second embodiment.

FIG. 8 is a diagram explaining the resolution reduction process in the present embodiment. An image 801 represents the pixels of a region in the image 2210 and their pixel values before the resolution reduction process. The present embodiment will be described on the assumption that the image is a single-channel grayscale image having a single pixel value per pixel. However, the image is not limited to a single-channel grayscale image but may be a multi-channel RGB image or the like. In the resolution reduction process in the present embodiment, the resolution is reduced by sub-sampling pixels at a predetermined resolution reduction rate (e.g., 50% in both the vertical direction and the horizontal direction), and simply expanding the sub-sampled pixels. Specifically, each sub-sampled pixel value is copied to the regions of the three pixels on the right, lower, and lower right sides. The result of this copying is illustrated as an image 802. In other words, an image 802 represents the pixels of the region in the image 2210 and their pixel values after the resolution reduction process.

Figure 9:
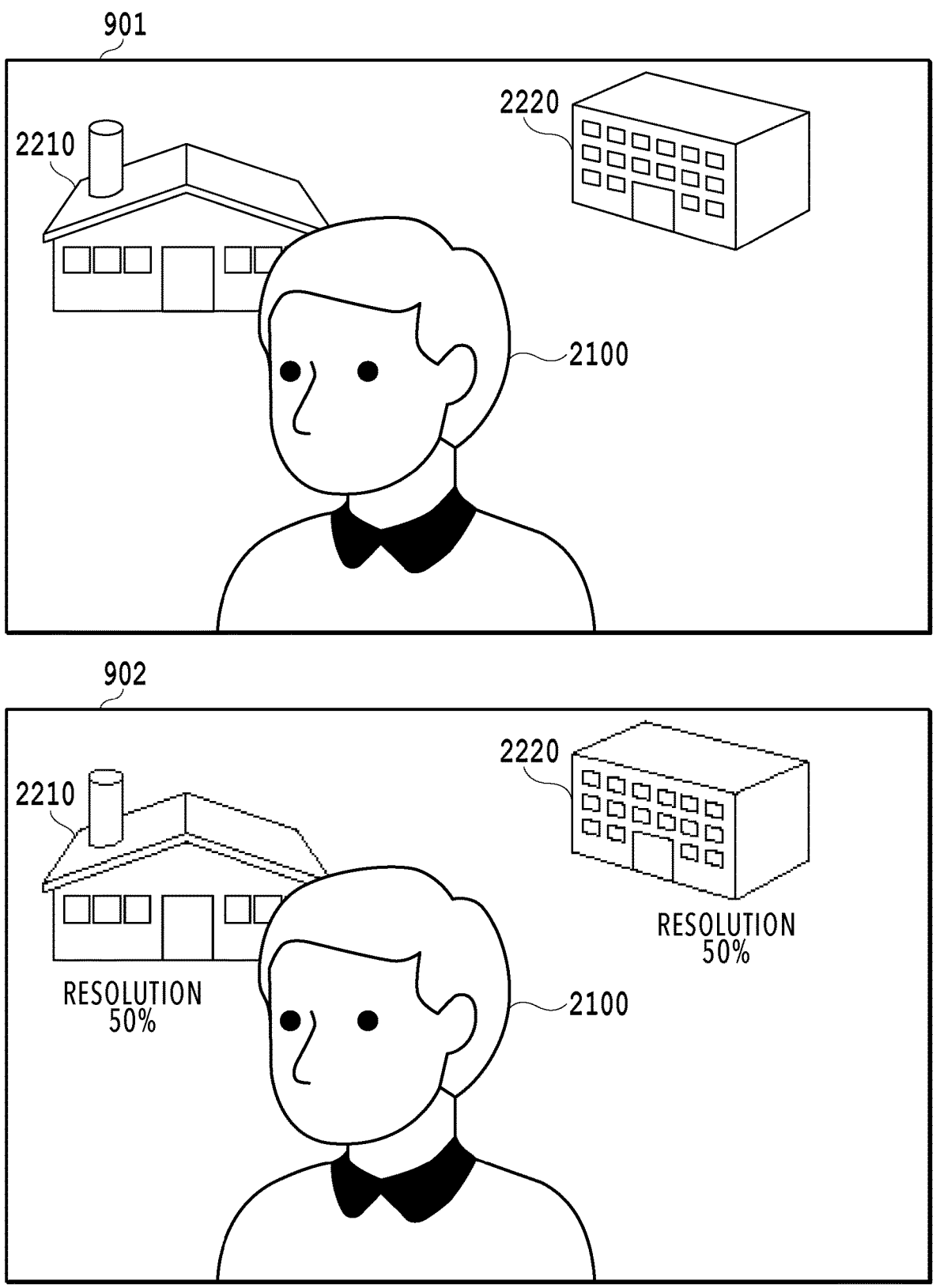
FIG. 9 is a diagram illustrating a virtual image before and after the resolution reduction process in the second embodiment.

FIG. 9 illustrates a virtual image 901 before the resolution reduction process and a virtual image 902 after the resolution reduction process in the present embodiment. In the virtual image 902 after the resolution reduction process, the resolution of the target images (i.e., the images 2210 and 2220) is low due to the resolution reduction process.

As described above, in the present embodiment, a resolution reduction process is performed as the image quality changing process on the images of objects with large movements (the building objects in the above example). As a result, the image of an object with a small movement (the human object in the above example) is maintained to be higher in resolution and therefore stands out in the virtual image. Accordingly, the viewer is likely to look at the image of the object with a small movement, and it is possible to reduce visually-induced motion sickness while maintaining the image quality of the object with a small movement.

Note that the resolution reduction rate is not limited to a predetermined value (50%) but may be determined according to the size of the optical flow.

Third Embodiment

In the present embodiment, a description will be given of a method of reducing visually-induced motion sickness by performing a brightness changing process as the image quality changing process.

In the following, description of configurations and a process flow similar to those in the first embodiment is omitted.

Figure 10:
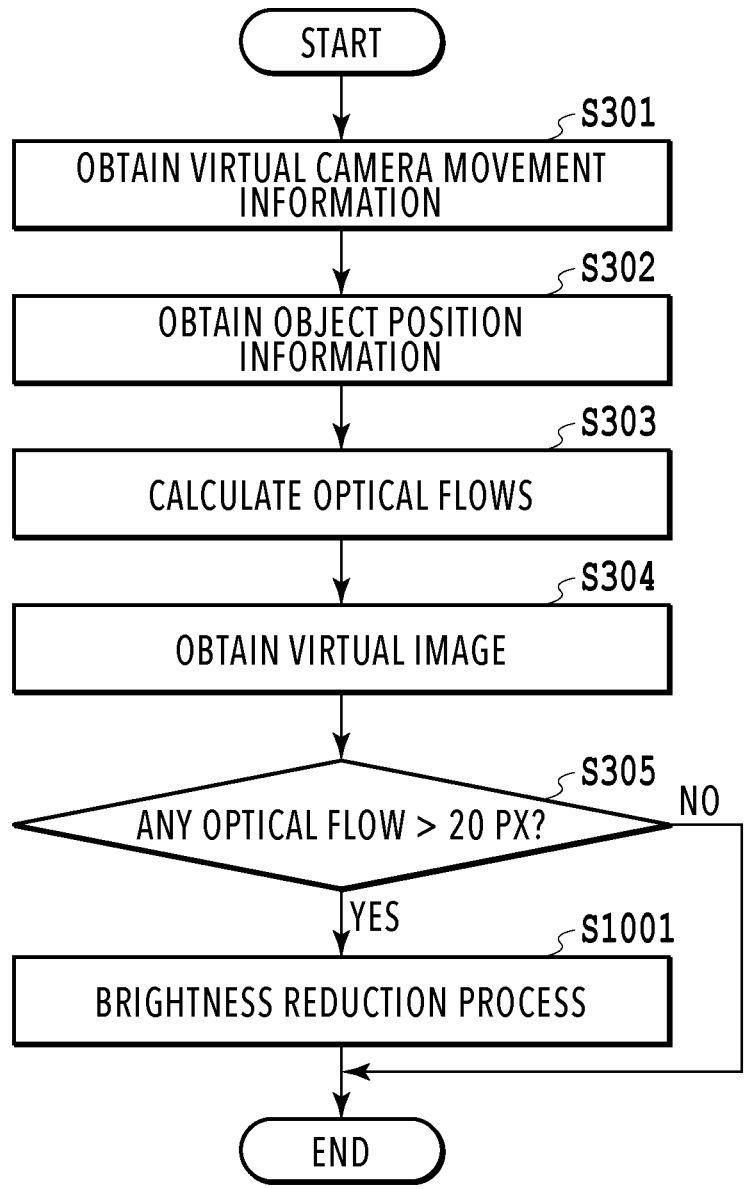
FIG. 10 is a diagram illustrating a flowchart of image processing in a third embodiment.

FIG. 10 illustrates the process flow of the image processing in the present embodiment. The processes at S301 to S305 are similar to those in the flowchart in FIG. 3 in the first embodiment.

At S1001, the image processing apparatus 200 performs the brightness changing process on the images 2210 and 2220, whose optical flows have been determined to be larger than the predetermined value. In the brightness changing process, the luminance value of each pixel of each target image is multiplied by a predetermined brightness changing coefficient to make the target image brighter or darker.

FIG. 11 illustrates the virtual image before and after the brightness changing process in the present embodiment. A virtual image 1101 represents the virtual image before the brightness changing process. A virtual image 1102 represents the virtual image after the process performed with the brightness changing coefficient set at 1.5 to make the target images brighter. A virtual image 1103 represents the virtual image after the process performed with the brightness changing coefficient set at 0.5 to make the target images darker. In the virtual image 1102, the brightness of the images 2210 and 2220 is high due to the brightness changing process, so that the images 2210 and 2220 are bright. On the other hand, in the virtual image 1103, the brightness of the images 2210 and 2220 is low, so that the images 2210 and 2220 are dark.

As described above, in the present embodiment, a brightness changing process is performed as the image quality changing process on the images of objects with large movements (the building objects in the above example). As a result, the image of an object with a small movement (the human object in the above example) is maintained in a suitable state and therefore stands out in the virtual image. Accordingly, the viewer is likely to look at the image of the object with a small movement, and it is possible to reduce visually-induced motion sickness while maintaining the image quality of the object with a small movement.

Meanwhile, although brightness is changed in the above process, saturation or contrast may be changed. In other words, in the present embodiment, the target image's color tone such as brightness, saturation, or contrast may be changed. The brightness, saturation, and contrast are correlated to the clearness of the image. Also, although a predetermined value is used as the brightness changing coefficient, the brightness changing coefficient may be determined according to the size of the optical flow.

Fourth Embodiment

In the first embodiment, a description has been given of an example where the virtual camera moves about the human object 1100. In the present embodiment, a description will be given of an example where the virtual camera moves differently from the virtual camera in the first embodiment.

In the following, description of configurations and a process flow similar to those in the first embodiment is omitted.

Figure 12:
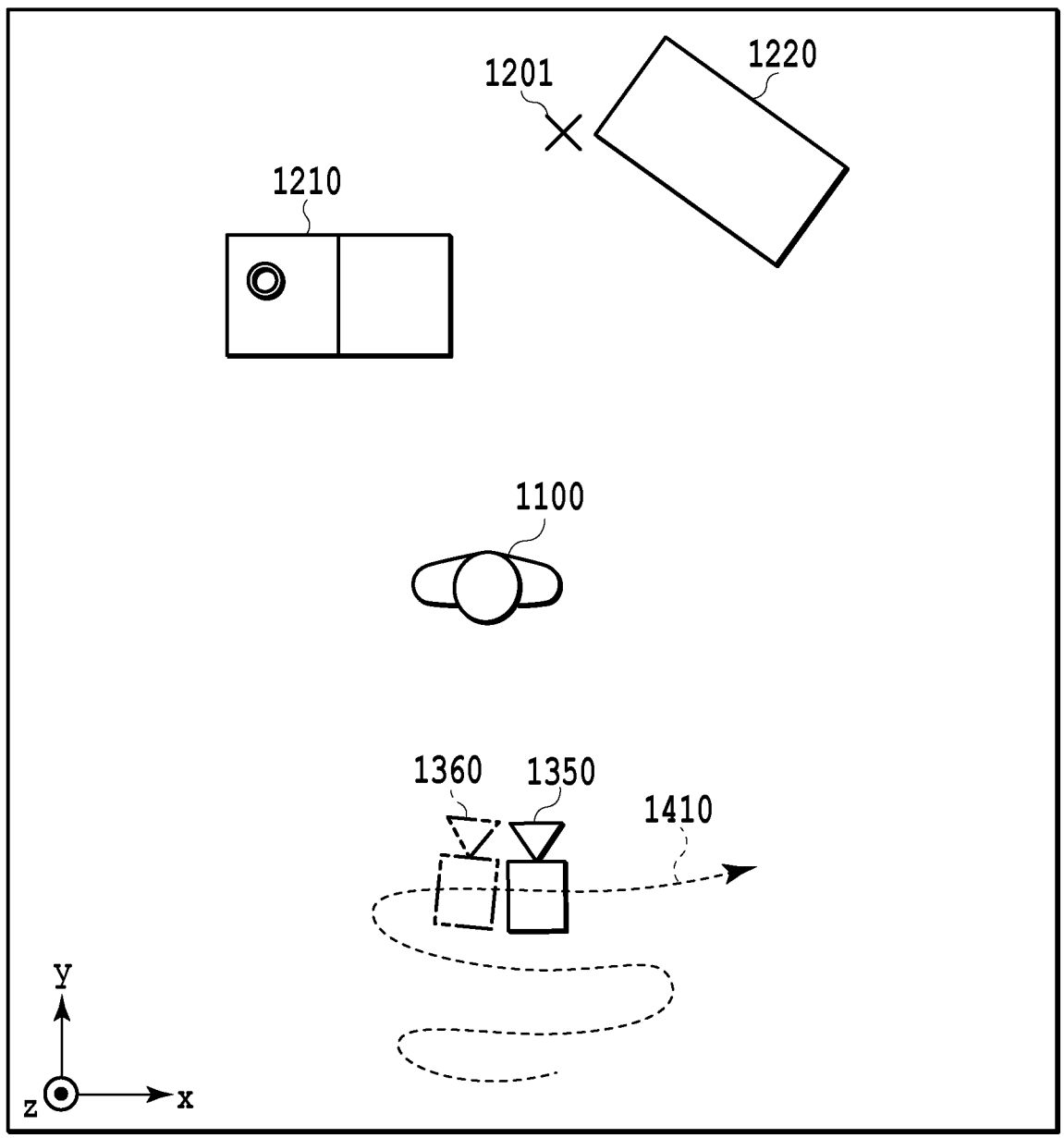
FIG. 12 is a diagram illustrating the positions of objects and a virtual camera in a virtual space in a fourth embodiment.

FIG. 12 illustrates the positions of objects and a virtual camera in a virtual space in the present embodiment. A virtual camera 1350 at a time L and a virtual camera 1360 at a time t-1, preceding the time t by a single frame, are illustrated on a path 1410. In the illustrated example, the virtual camera rotates about a rotational center 1201 near the objects 1210 and 1220 but moves back and forth while facing the rotational center 1201. Thus, in the video, the object 1100 moves back and forth in the horizontal direction in the virtual image.

In this case, among the magnitudes of the optical flows calculated at S303 in FIG. 3, the magnitude of the optical flow of the object 1100 is 50.3 px. On the other hand, the magnitudes of the optical flows of the objects 1210 and 1220 are 19.5 px and 15.7 px, respectively. Thus, the blurring process at S306 is performed on the image of the object 1100, whose optical flow has a magnitude larger than 20 px.

At S306, the image processing unit 240 performs the blurring process with a filter size 5, which is determined by multiplying the magnitude of the optical flow of the object 1100 by a predetermined coefficient a (=0.1).

Figure 13:
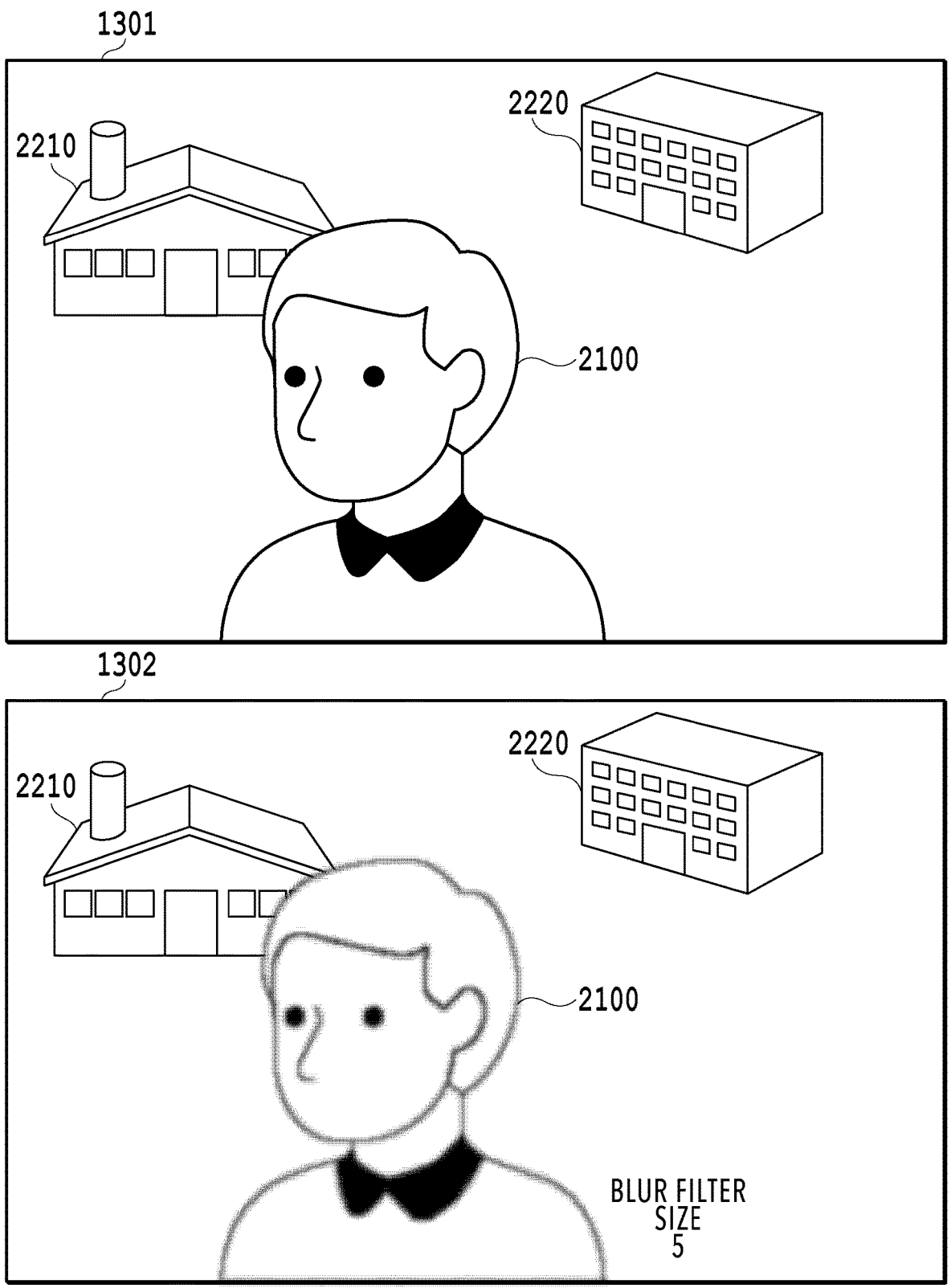
FIG. 13 is a diagram illustrating a virtual image before and after a blurring process in the fourth embodiment.

FIG. 13 illustrates a virtual image 1301 before the blurring process and a virtual image 1302 after the blurring process in the present embodiment. In the virtual image 1302 after the blurring process, the image 2100 is unsharp due to the blurring process. In other words, in the present embodiment, the object in the foreground is blurred to make the viewer look at the background.

As described above, in the present embodiment, the blurring process is performed on the image of a different object due to the movement of the virtual camera. Accordingly, the viewer is likely to look at the image of the object with a small movement, and it is possible to reduce visually-induced motion sickness while maintaining the image quality of the object with a small movement. Note that although the blurring process, the resolution reduction process, and the brightness changing process (i.e., color tone changing process) have been described in the foregoing embodiments, these processes may be performed in combination with each other.

Also, in the foregoing embodiments, the image processing apparatus 200 controls an image quality of an object(s) identified on the basis of the magnitudes of movements of all objects in the virtual image. However, the method of determining the image quality changing target is not limited to the above. In one example, in generating a virtual image with a moving virtual camera, the image processing apparatus 200 may perform image processing such that the amount of blur is increased only in regions other than an object(s) specified in advance by a user operation or the like. In another example, the image processing apparatus 200 may perform image processing such that the amount of blur is increased only in regions other than a predetermined type of object (such as person, for example). In still another example, the image processing apparatus 200 may perform image processing such that the amount of blur is increased only in regions other than an object(s) within a predetermined distance from the virtual camera.

Also, in the case of generating a virtual image based on captured images, the image processing apparatus 200 may identify a predetermined object in the image capture target region on the basis of the captured images and perform image processing such that the amount of blur is increased only in regions other than the predetermined object in the virtual image. The object identified on the basis of the captured images may be, for example, a moving object or an object present in the image capture target region only for a particular period.

Note that the region in the virtual image whose image quality such as the amount of blur is to be changed may be the entire region excluding the object(s) identified by a method as above. Alternatively, the image quality of a region within a predetermined range from the identified object(s) may remain unchanged. Still alternatively, among the regions of the objects included in the virtual image, the region of the object(s) other than the object(s) identified by a method as above may be the image quality changing target. In other words, the image quality of the regions with no object may remain unchanged. Also, the image processing apparatus 200 may determine the degree of the above-described blurring process, resolution reduction process, brightness changing process, or the like on the basis of, for example, the speed of movement of the virtual camera or the angle of view of the virtual camera.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to reduce the user's visually-induced motion sickness while suppressing decrease in visual recognizability of a particular object in an image.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-139350, filed Jul. 25, 2018, which is hereby incorporated by reference herein in its entirety.

What is claimed is:

1. An image processing apparatus comprising:
one or more memories storing instructions; and
one or more processors executing the instructions to:
specify at least one of a difference between a position of a first virtual viewpoint and a position of a second virtual viewpoint or a difference between a view direction from the first virtual viewpoint and a view direction from the second virtual viewpoint, each of a first virtual viewpoint image according to the first virtual viewpoint and a second virtual viewpoint image according to the second virtual viewpoint corresponding to one of frames included in a movie;
determine, based on the specified difference, for an object, a degree of a difference between a position of the object in the first virtual viewpoint image according to the first virtual viewpoint and a position of the object in the second virtual viewpoint image according to the second virtual viewpoint; and
generate, based on the determined degree, the second virtual viewpoint image,
wherein, in a case where a first determined degree for a first object is larger than a second determined degree for a second object, the first object in the second virtual viewpoint image is lower in clearness than the second object in the second virtual viewpoint image.

2. The image processing apparatus according to claim 1,
wherein the one or more processors further execute the instructions to determine the clearness of the object in the second virtual viewpoint image based on the determined degree, and
wherein the second virtual viewpoint image is generated based on the determined clearness.

3. The image processing apparatus according to claim 2,
wherein the one or more processors further execute the instructions to specify a three-dimensional position of the object in a virtual space, and
wherein the degree for the object is determined further based on the specified three-dimensional position of the object.

4. The image processing apparatus according to claim 3, wherein the three-dimensional position of the object is specified based on at least one of a three-dimensional position of a barycenter of the object, a three-dimensional position of a representative point of the object, or three-dimensional positions of a plurality of elements forming the object.

5. The image processing apparatus according to claim 1, wherein the second virtual viewpoint image is generated by performing a process of reducing the clearness of at least a part of an image provided from outside the image processing apparatus.

6. The image processing apparatus according to claim 5, wherein the process of reducing the clearness is performed using at least one of a Gaussian filter, an averaging filter, or a motion blur filter.

7. The image processing apparatus according to claim 1, wherein the one or more processors further execute the instructions to cause a display device to display at least one of the first virtual viewpoint image or the second virtual viewpoint image.

8. The image processing apparatus according to claim 1, wherein the clearness is inversely correlated to a degree of blur of an image.

9. The image processing apparatus according to claim 1, wherein the clearness is correlated to resolution of an image.

10. The image processing apparatus according to claim 1, wherein the clearness is correlated to at least one of brightness, saturation, or contrast of an image.

11. The image processing apparatus according to claim 1, wherein
at least one of the first virtual viewpoint image and the second virtual viewpoint image is generated based on a plurality of images captured from different directions by a plurality of image capture apparatuses.

12. The image processing apparatus according to claim 1, wherein the object is a person or a structure.

13. The image processing apparatus according to claim 1, wherein the first determined degree for the first object is
a degree of a difference between a position of the first object in the first virtual viewpoint image and a position of the first object in the second virtual viewpoint image, and
wherein the second determined degree for the second object is a degree of a difference between a position of the second object in the first virtual viewpoint image and a position of the second object in the second virtual viewpoint image.

14. The image processing apparatus according to claim 1, wherein the second virtual viewpoint image is generated by performing a process of reducing the clearness of at least a part of an image of the object.

15. The image processing apparatus according to claim 1, wherein the first virtual viewpoint image is generated before the second virtual viewpoint image is generated.

16. The image processing apparatus according to claim 1, wherein a frame corresponding to the second virtual viewpoint image is next to a frame corresponding to the first virtual viewpoint image.

17. An image processing method comprising:
specifying at least one of a difference between a position of a first virtual viewpoint and a position of a second virtual viewpoint or a difference between a view direction from the first virtual viewpoint and a view direction from the second virtual viewpoint, each of a first virtual viewpoint image according to the first virtual viewpoint and a second virtual viewpoint image according to the second virtual viewpoint corresponding to one of frames included in a movie;
determining, based on the specified difference, for an object, a degree of a difference between a position of the object in the first virtual viewpoint image according to the first virtual viewpoint and a position of the object in the second virtual viewpoint image according to the second virtual viewpoint; and
generating, based on the determined degree, the second virtual viewpoint image,
wherein, in a case where a first determined degree for a first object is larger than a second determined degree for a second object, the first object in the second virtual viewpoint image is lower in clearness than the second object in the second virtual viewpoint image.

18. The image processing method according to claim 17, further comprising:
determining the clearness of the object in the second virtual viewpoint image based on the determined degree,
wherein the second virtual viewpoint image is generated based on the determined clearness.

19. The image processing method according to claim 18, further comprising:
specifying a three-dimensional position of the object in a virtual space,
wherein the degree for the object is determined further based on the three-dimensional position of the object.

20. A non-transitory computer readable storage medium storing a program for causing a computer to perform an image processing method, the method comprising:
specifying at least one of a difference between a position of a first virtual viewpoint and a position of a second virtual viewpoint or a difference between a view direction from the first virtual viewpoint and a view direction from the second virtual viewpoint, each of a first virtual viewpoint image according to the first virtual viewpoint and a second virtual viewpoint image according to the second virtual viewpoint corresponding to one of frames included in a movie;
determining, based on the specified difference, for an object, a degree of a difference between a position of the object in the first virtual viewpoint image according to the first virtual viewpoint and a position of the object in the second virtual viewpoint image according to the second virtual viewpoint; and
generating, based on the determined degree, the second virtual viewpoint image,
wherein, in a case where a first determined degree for a first object is larger than a second determined degree for a second object, the first object in the second virtual viewpoint image is lower in clearness than the second object in the second virtual viewpoint image.

* * * * *